Nov. 14, 1961  H. A. VANDER KAAY ET AL  3,008,488
CONTROL VALVE
Filed Nov. 16, 1959  2 Sheets-Sheet 1

INVENTORS
Henry A. Vander Kaay
and Charles J. Worth

BY Dodge and Sons
ATTORNEYS

Nov. 14, 1961　　H. A. VANDER KAAY ET AL　　3,008,488
CONTROL VALVE
Filed Nov. 16, 1959　　2 Sheets-Sheet 2

INVENTORS
Henry A. Vander Kaay
and Charles J. Worth
BY  *Dodge and Sons*
ATTORNEYS 3,008,488
CONTROL VALVE
Henry A. Vander Kaay, Kalamazoo, Mich., and Charles J. Worth, Bergenfield, N.J., assignors to The New York Air Brake Company, a corporation of New Jersey
Filed Nov. 16, 1959, Ser. No. 853,313
6 Claims. (Cl. 137—621)

This invention relates to hydraulic valves for controlling a plurality of double-acting fluid pressure motors.

These valves frequently include a plurality of control units, one for each motor, which are so connected that each motor may be operated either individually or in series with one or more of the other motors. In the series arrangement, the fluid exhausting from the first motor is supplied as motive fluid to the next motor and, therefore, when one motor in the series stalls, all of the motors stall. When this happens, relief can be had only by returning some of the control units to their neutral positions, so that the motors they control no longer impose a back pressure on the pressure source. This is an undesirable remedy because it removes the positive holding forces from the motors at a time when the motors are under load. Dropping of these loads could result.

The object of this invention is to provide a valve in which the control units are so designed and arranged that any one of a plurality of motors may be operated individually or any two or more may be operated either in series or in parallel. With this valve, the stalled condition encountered during series operation may be relieved by shifting the control units to positions establishing a parallel flow circuit and, therefore, the risk of dropping loads is minimized.

The preferred embodiment of the invention will now be described in detail with reference to the accompanying drawings, in which.

Figure 1:
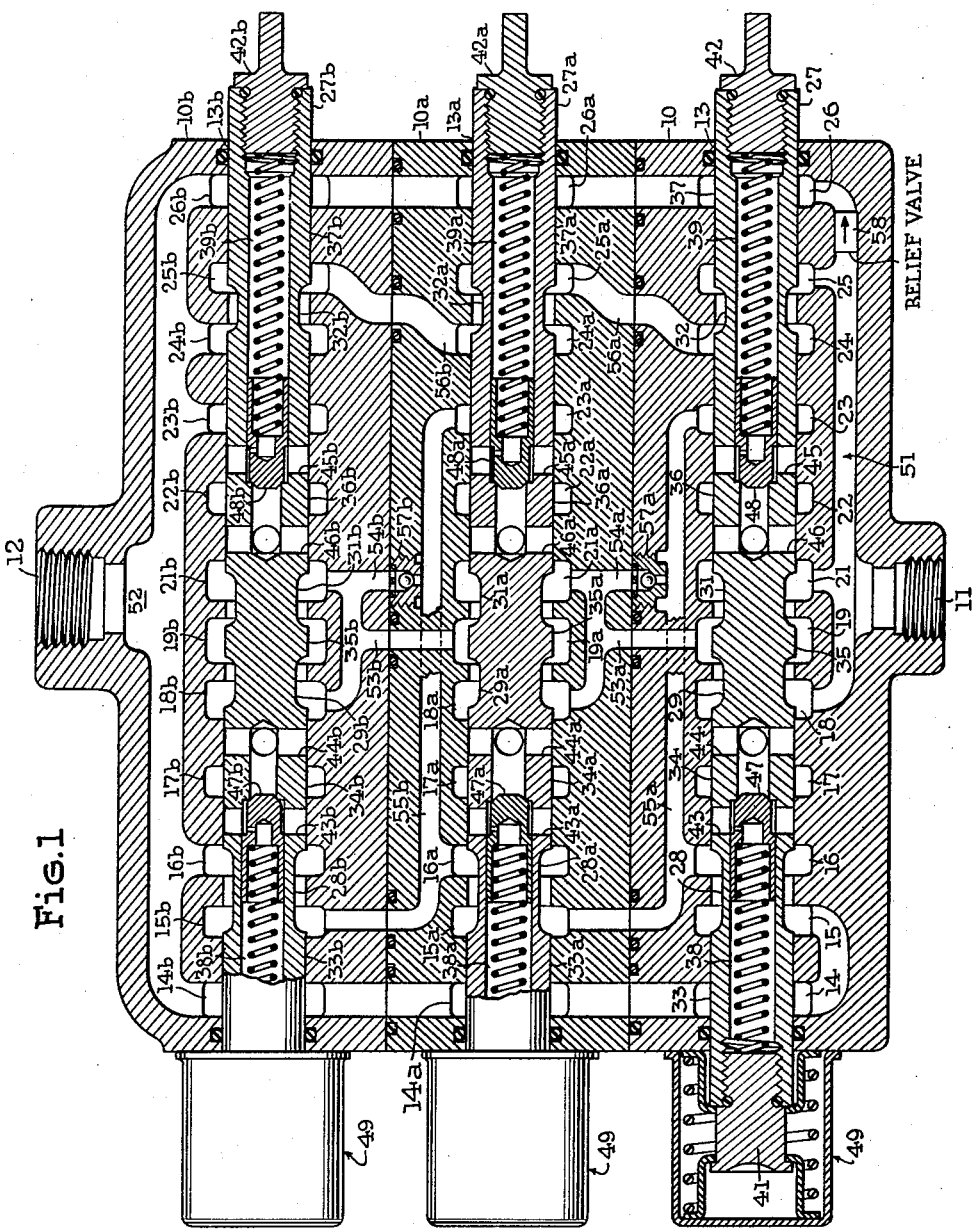
FIG. 1 is a partial axial sectional view of a sliding plunger control valve incorporating the invention; the three plungers being shown in their neutral positions.

As shown in FIG. 1, the valve comprises a housing including three sections 10, 10a and 10b; the section 10 containing an inlet port 11 and the section 10b containing an exhaust port 12. Extending through section 10 is a valve bore 13 which is intersected by twelve spaced annular chambers 14 through 19, and 21 through 26. Slidable in the bore 13 is a valve plunger 27 formed with four spaced annular grooves 28, 29, 31 and 32 which define the valve lands 33 through 37. The plunger 27 contains two axial bores 38 and 39 whose outer ends are closed and sealed by threaded plugs 41 and 42, respectively. Two spaced series of radial passages 43 and 44 extend through the land 34 and intersect bore 38. Two similar series 45 and 46 extend through the land 36 and intersect bore 39. Check valves 47 and 48 are positioned in the bores 38 and 39, respectively, for controlling communication between passages 43 and 44 and between passages 45 and 46. At its left end, the plunger 27 is provided with a centering spring device 49 which urges it to the neutral position shown in FIG. 1.

The housing sections 10a and 10b are provided with identical bores 13a and 13b and plungers 27a and 27b.

The annular chambers 18 and 21 of housing section 10 are connected with inlet port 11 and with annular chamber 25 by supply passage 51, while exhaust manifold 52 connects annular chambers 14b, 16b, 23b, 24b and 26b of housing section 10b with the exhaust port 12 and with annular chambers 14, 14a, 26 and 26a. Inter-connecting passages 53a, 53b, 54a, 54b, 55a, 55b, 56a, and 56b link the three housing sections together in series in the manner shown in FIG. 1. Check valves 57a and 57b are positioned in the passages 54a and 54b, respectively, and oriented so as to permit flow to but not from passages 53a and 53b. A relief valve 58, located in housing section 10, limits the pressure in inlet port 11 by by-passing fluid to exhaust manifold 52.

During operation, the three pair of motor ports (not shown) that communicate with annular chambers 17 and 22, 17a and 22a, and 17b and 22b are connected with the opposite sides of three double-acting motors. When the valve plungers 27, 27a and 27b are in the neutral positions shown in FIG. 1, lands 34 and 36, 34a and 36a, and 34b and 36b isolate the motor chambers 17 and 22, 17a and 22a, and 17b and 22b from the other chambers, and the plunger grooves 32, 32a and 32b establish an unrestricted unloading path between inlet port 11 and exhaust port 12 through passage 51, annular chambers 25 and 24, passage 56a, annular chambers 25a and 24a, passage 56b, annular chambers 25b and 24b, and exhaust manifold 52. Under these conditions, the three motors are hydraulically locked and the pump is unloaded at a low back pressure.

Figure 2:
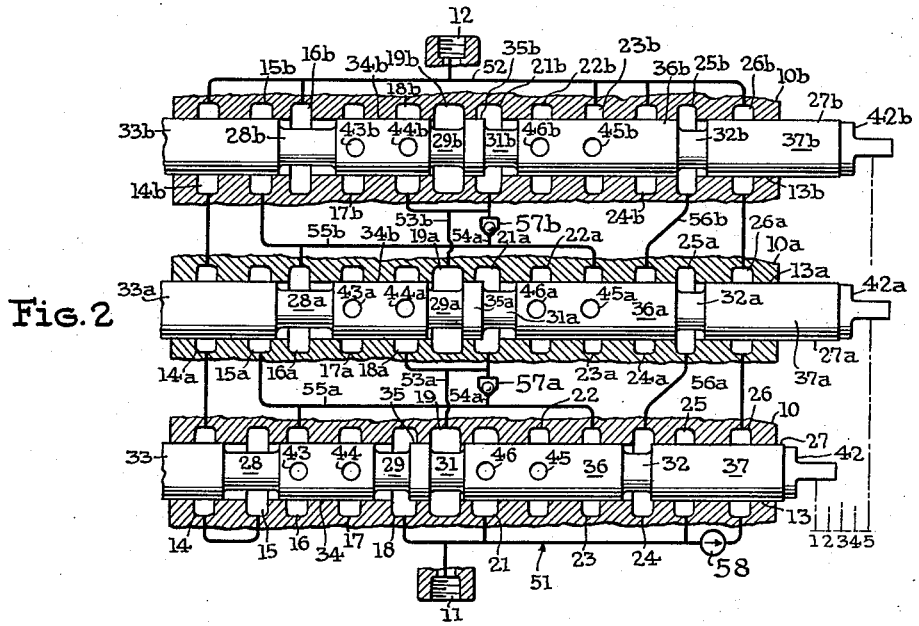
FIG. 2 is a simplified drawing similar to FIG. 1 but showing each plunger in one of its two series flow-establishing positions.
Figure 3:
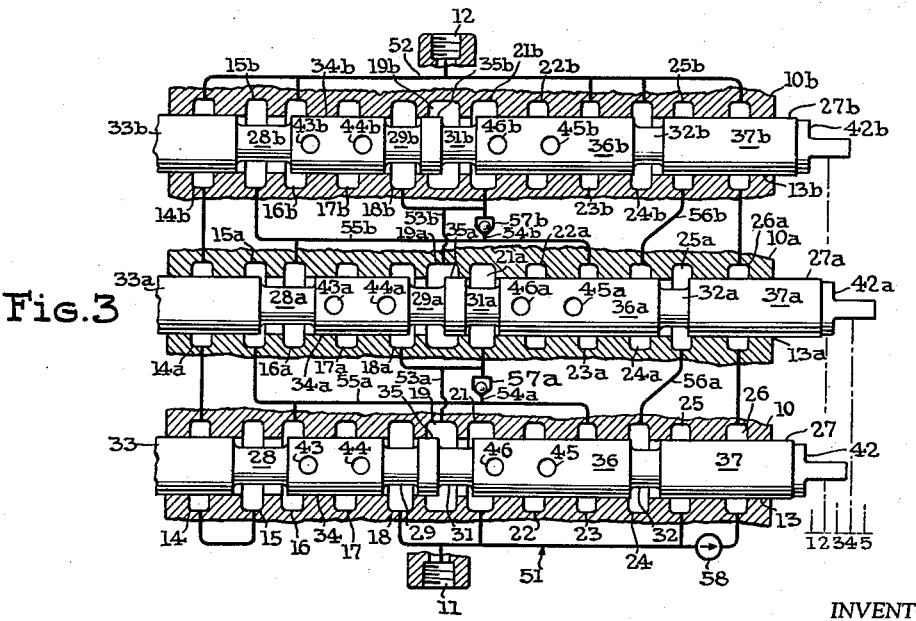
FIG. 3 is a view similar to FIG. 2 but showing each plunger in one of its two parallel flow-establishing positions.

In order to operate one of the double-acting motors, for example the one controlled by the valve unit in section 10, the plunger 27 is shifted away from its neutral position to one of the four other operative positions illustrated in FIGS. 2 and 3. If the plunger is shifted to either the No. 1 or No. 2 position, land 37 interrupts the unloading path by blocking communication between annular chambers 24 and 25, and radial passages 45 and 46 interconnect annular chambers 21 and 22. Pressure fluid entering inlet port 11 may now flow to that side of the double-acting motor connected with chamber 22 along a path comprising passage 51, chamber 21, radial passages 46, axial bore 39, check valve 48, radial passages 45, and annular chamber 22. Fluid returning from the opposite side of the motor enters annular chamber 17 and flows to the exhaust port 12 through passages 44, axial bore 38, check valve 47, radial passages 43, annular chamber 16, passage 55a, annular chambers 15a and 16a, passage 55b, annular chamber 15b and 16b, and exhaust manifold 52. If the plunger 27 is in the No. 2 position rather than the No. 1 position, passage 59, annular chambers 14 and 15, and plunger groove 28 provide an additional exhaust path.

In order to operate the double-acting motor in the opposite direction, plunger 27 is moved to the right from its neutral position to either the No. 4 or the No. 5 position. In these positions, the land 36 interrupts the unloading path and the radial passages 43, 44, 45 and 46 interconnect annular chambers 17 and 18, and 22 and 23, respectively. The return paths provided in the positions Nos. 4 and 5 correspond to the return paths provided in positions Nos. 2 and 1, respectively.

The other two motors may be operated individually in a similar manner by shifting the plungers 27a and 27b away from their neutral positions.

All three double-acting motors may be connected in a series circuit by shifting each of the plungers to either its No. 1 or No. 5 position. FIG. 2 illustrates the case in which plunger 27 is in its No. 1 position and the other two plungers are in the No. 5 position. In this arrangement, the unloading path is interrupted and pressure fluid is supplied to annular chamber 22 of housing section 10 in the manner discussed above. However, now the normally open exhaust path from the opposite side of the double-acting motor controlled by plunger 27 is blocked by lands 34 and 33a. Consequently, the return flow entering passage 55a unseats the check valve 57a and flows to motor chamber 17a of housing section 10a through passages 54a and 53a, annular chamber 18a, radial passages 44a, axial bore 38a, check valve 47a, and radial passages 43a. Fluid returning from the opposite side of the motor controlled by valve unit 10a flows to motor chamber 17b of unit 10b along a path including passage 55b, check valve 57b, and passages 54b and 53b. Return flow from motor chamber 22b passes directly to the exhaust port 12 through radial passages 46b, axial bore 39b, check valve 48b, radial passages 45b, annular chamber 23b, and exhaust manifold 52. It can be seen that when each of the valve plungers is in either the No. 1 or the No. 5 position, the exhaust flow returning from each double-acting motor is the motive fluid for the motor controlled by the valve unit next in line. In other words, the motor controlled by unit 10 is supplied directly from inlet port 11 and its return flow operates the motor controlled by unit 10a. The return flow from this motor, in turn, is the motive fluid for the motor associated with valve unit 10b.

Parallel operation of the three motors occurs when each of the plungers is shifted to either its No. 2 or No. 3 position. FIG. 3 illustrates a typical case in which plungers 27 and 27b are in the No. 2 position and the plunger 27a is in the No. 4 position. As in the case of series operation, land 37 interrupts the unloading path and inlet fluid from port 11 is supplied to the motor chamber 22 through radial passages 45 and 46. However, in this case, plunger grooves 31 and 29a simultaneously supply fluid to the motor chambers 17a and 22b. Thus it is seen that the supply connections to the three double-acting motors are arranged in parallel flow relation. Since, in either the No. 2 or the No. 4 position, the plunger grooves 28, 28a and 28b interconnect annular chambers 15 and 16, 15a and 16a, and 15b and 16b, respectively, the return flows from the motors entering annular chambers 17, 22a and 17b flow in parallel relation to the exhaust port 12. It is thus seen that the No. 2 and No. 4 positions provide a true parallel flow circuit.

FIGS. 2 and 3 illustrate the flow connections which are established when all three plungers are in either a series or a parallel position. From what has been said already, the flow paths established when only two of the plungers are shifted from their neutral positions will be obvious.

While the illustrated embodiment includes only three control units, it will be apparent that the number used depends upon the environment in which the valve is employed. If only two motors are to be controlled, the valve unit 10a can be omitted. On the other hand, if more than three motors must be operated, it is only necessary to add an additional valve unit 10a for each additional motor.

As stated previously, the drawings and description relate only to a preferred form of the invention. Since many changes in the structure of this embodiment can be made without departing from the inventive concept, the following claims should provide the sole measure of the scope of the invention.

What is claimed is:

1. A valve comprising a housing containing inlet and exhaust ports and two pair of motor ports, namely a first and a second pair; passages interconnecting the six ports; and two movable valve members, one for controlling communication between each pair of motor ports and the inlet and exhaust ports, the movable members having: a first position in which means carried by the valve members and the housing isolate each motor port from the other five ports; a second position in which means carried by the valve members and the housing connect one motor port of the first pair with the inlet port, connect the other motor port of this pair with the exhaust port, isolate the inlet and exhaust ports from each other, and isolate each motor port of the second pair from the other five ports; a third position similar to the second but in which means carried by the valve members and the housing reverse the connections between the inlet and exhaust ports and the motor ports of the first pair; fourth and fifth positions corresponding to the second and third positions, respectively, but in which means carried by the valve members and the housing connect the motor ports of the second pair with the inlet and exhaust ports and isolate the motor ports of the first pair from each other and from the other four ports; a sixth position in which means carried by the valve members and the housing connect one motor port of the first pair with one motor port of the second pair and with the inlet port, connect the other motor port of the first pair with the remaining motor port of the second pair and with the exhaust port, and isolate the inlet and exhaust ports from each other; a seventh position similar to the sixth position but in which means carried by the valve members and the housing connect the said one motor port of the first pair with the said remaining motor port of the second pair and with the exhaust port, while connecting the said other motor port of the first pair with the said one port of the second pair and with the inlet port; eighth and ninth positions corresponding to the sixth and seventh positions, respectively, but in which means carried by the valve members and the housing reverse the connections between the inlet and exhaust ports and the motor ports; a tenth position in which means carried by the valve members and the housing connect one motor port of the first pair with the inlet port, connect the other motor port of the first pair with one motor port of the second pair, and connect the remaining motor port of the second pair with the exhaust port; an eleventh position similar to the tenth position but in which means carried by the valve members and the housing connect the said other motor port of the first pair with the inlet port and connect the said one motor port of the first pair with the said one motor port of the second pair; and twelfth and thirteenth positions corresponding to the tenth and eleventh positions, respectively, but in which means carried by the valve members and the housing conect the said remaining motor port of the second pair with the motor port of the first pair, and connect the said one motor port of the second pair with the exhaust port.

2. The valve defined in claim 1 in which, in the first position, means carried by the valve members and the housing connect the inlet port with the exhaust port.

3. A valve comprising a housing containing a valve bore; ten spaced chambers intersecting the valve bore, there being a central chamber, right and left outer chambers located on opposite sides of the central chamber, right and left intermediate chambers located between the central chamber and the right and left outer chambers, a second right intermediate chamber located between the first right intermediate chamber and the central chamber, right and left motor chambers located, respectively, between the second right intermediate chamber and the central chamber and between the left intermediate chamber and the central chamber, and right and left supply chambers located between the central chamber and the right and left motor chambers; a valve member movable in the bore and having four lands separated by three grooves, there being a center land, right and left outer lands located on opposite sides of the center land, and a right intermediate land located between the center land and the right outer land; a first passage formed in the movable member and opening through the right intermediate land at two spaced points; and a second passage formed in the movable member and opening through the left outer land at two spaced points, the parts being so dimensioned that the valve has: a first position in which the right intermediate and left outer lands isolate the right and left motor chambers, respectively, from the other chambers; a second position in which the first passage interconnects the right supply and right motor chambers, the second passage interconnects the left motor and left intermediate chambers, and the groove between the center and right intermediate lands interconnects the central and right supply chambers; a third position in which the first passage interconnects the right motor chamber and the second right intermediate chamber, the second passage interconnects the left motor and left supply chambers, and the groove between the center and left outer lands interconnects the central and left supply chambers; a fourth position in which the first passage interconnects the right motor and second right intermediate chambers, the second passage interconnects the left motor and left supply chambers, and the center and left lands isolate the central chamber from the other chambers; and a fifth position in which the first passage interconnects the right motor and right supply chambers, the second passage interconnects the left motor and left intermediate chambers, and the center and right intermediate lands isolate the central chamber from the other chambers.

4. The valve defined in claim 3 in which, in the first position, the groove between the right outer and right intermediate lands interconnects the right outer and right first intermediate chambers.

5. A valve comprising a housing containing inlet and exhaust ports and a plurality of pairs of motor ports; a plurality of valve units, one for controlling flow between each pair of motor ports and the inlet and exhaust ports, each valve unit including a bore intersected by ten spaced chambers, namely, a central chamber, right and left outer chambers located on opposite sides of the central chamber, right and left intermediate chambers located between the central chamber and the right and left outer chambers, a second right intermediate chamber located between the central chamber and the first right intermediate chamber, right and left motor chambers located, respectively, between the central chamber and the second right intermediate and between the central chamber and the left intermediate chamber, and right and left supply chambers located between the central chamber and the right and left motor chambers, and a valve member movable in the bore and having a center land, right and left outer lands located on opposite sides of the center land, a right intermediate land located between the center land and the right outer land, a first passage opening through the right intermediate land at two spaced points, and a second passage opening through the left outer land at two spaced points, each valve member having a first position in which the right intermediate and left outer lands isolate the right and left motor chambers, respectively, from the other chambers; a second position in which the first passage interconnects the right supply and right motor chambers, the second passage interconnects the left motor and left intermediate chambers, and the groove between the center and right intermediate lands interconnects the central and right supply chambers; a third position in which the first passage interconnects the right motor chamber and the second right intermediate chamber, the second passage interconnects the left motor and left supply chambers, and the groove between the center and left outer lands interconnects the central and left supply chambers; a fourth position in which the first passage interconnects the right motor and second right intermediate chambers, the second passage interconnects the left motor and left supply chambers, and the center and left lands isolates the central chamber from the other chambers; and a fifth position in which the first passage interconnects the right motor and right supply chambers, the second passage interconnects the left motor and left intermediate chambers, and the center and right intermediate lands isolate the central chamber from the other chambers; supply passages connecting the inlet port with the right and left supply chambers and with the right outer chamber of one of the valve units; exhaust passages connecting the exhaust port with the right first and second intermediate chambers and with the left intermediate chamber of a second valve unit; interconnecting passages linking the valve units in a series, there being: first passages connecting the central chamber of each valve unit, except said second unit, with the left and right supply chambers of another unit; second passages connecting the first right intermediate chamber of each unit, except said second unit, with the right outer chamber of another unit; third passages connecting the second right intermediate and left intermediate chambers of each unit, except said second unit, with the left outer chamber of another unit; and fourth passages connecting the central chamber of each unit, except said second unit, with the second right intermediate and left intermediate chambers of the same unit; and a check valve located in each of said fourth passages and oriented to prevent flow from the central chamber to the intermediate chambers.

6. The valve defined in claim 5 in which, in the first position, the groove between the right outer and right intermediate lands interconnects the right outer and right first intermediate chambers.

References Cited in the file of this patent

UNITED STATES PATENTS

| | | |
|---|---|---|
| 2,651,324 | Hodgson et al. | Sept. 8, 1953 |
| 2,856,960 | Stacey | Oct. 21, 1958 |